(12) United States Patent
Chtourou

(10) Patent No.: US 6,436,856 B1
(45) Date of Patent: Aug. 20, 2002

(54) THICKENABLE VINYL ESTER RESIN COMPOSITIONS

(75) Inventor: Halim Chtourou, Grandby (CA)

(73) Assignee: Simex Technologies, Inc., Saint-Laurent (CA)

( * ) Notice: Subject to any disclaimer, the term of this patent is extended or adjusted under 35 U.S.C. 154(b) by 0 days.

(21) Appl. No.: 09/593,392

(22) Filed: Jun. 14, 2000

Related U.S. Application Data

(60) Provisional application No. 60/138,975, filed on Jun. 14, 1999.

(51) Int. Cl.$^7$ .............................................. B32B 27/38
(52) U.S. Cl. ........................ 442/175; 442/180; 525/530; 525/531; 525/922
(58) Field of Search .......................... 523/457; 442/175, 442/180; 525/530, 531, 922

(56) References Cited

U.S. PATENT DOCUMENTS

| | | | |
|---|---|---|---|
| 3,466,259 A | 9/1969 | Jernigan et al. | 260/37 |
| 3,548,030 A | 12/1970 | Jerigan et al. | 260/836 |
| 3,649,546 A | 3/1972 | McCloskey | 252/186 |
| 4,197,390 A | 4/1980 | Jackson | 528/115 |
| 4,221,889 A | 9/1980 | Rowe | 525/404 |
| 4,347,343 A | 8/1982 | Brewbaker | 525/530 |
| 4,368,311 A | 1/1983 | Binder et al. | 526/317 |
| 4,398,003 A | 8/1983 | Irwin | 525/531 |
| 4,948,821 A | 8/1990 | De Koning et al. | 523/500 |

FOREIGN PATENT DOCUMENTS

| | | |
|---|---|---|
| DE | B2 44 06 646 | 9/1995 |
| EP | B1 0 518 122 | 12/1992 |

*Primary Examiner*—Robert Dawson
*Assistant Examiner*—D. Aylward
(74) *Attorney, Agent, or Firm*—Ogilvy Renault

(57) ABSTRACT

A curable vinyl ester resin composition capable of undergoing B-staging at room temperature comprises (a) an unmodified vinyl ester resin; (b) a reactive diluent consisting of an ethylenically unsaturated monomer; (c) a free-radical curing agent; (d) a B-staging agent comprising a Group II metal oxide or hydroxide, or a mixture thereof; and (e) a thickening agent comprising an ester, a ketone, an aldehyde or a mixture thereof. The thickening agent coacts with the B-staging agent to cause B-staging of the vinyl ester resin at room temperature. The vinyl ester resin composition according to the invention is particularly useful for impregnating a fibrous material such as a woven fabric material. The fibrous material impregnated with the vinyl ester resin composition of the invention has a shelf life of up to 12 months. B-staging is generally reached in about two weeks following mixture of the various components and impregnation of the fibrous material.

56 Claims, No Drawings

THICKENABLE VINYL ESTER RESIN COMPOSITIONS

This application claims benefit to U.S. application Ser. No. 60/138,975, filed Jun. 14, 1999.

BACKGROUND OF THE INVENTION

The present invention pertains to improvements in the field of thermosetting polymer compositions. More particularly, the invention relates to a curable vinyl ester resin composition which is capable of undergoing B-staging at room temperature and which is suitable for impregnating a fibrous material.

In the conventional production of a resin pre-impregnated fibrous material, the fibrous material is impregnated with a curable resin dissolved in a solvent and the resin is partially cured to a B-stage by the application of heat followed by a solvent recuperation. A B-stage is a temporary phase which occurs after the resin has undergone an increase in viscosity without solidification and during which the increased viscosity remains stable. The pre-impregnated fibrous material is then stored or shipped to an end-user who completes the cure with heat and pressure in a molding operation. Such a process is costly since it requires the application of heat during the partial curing and a subsequent solvent recuperation.

It is known that a Group II metal oxide or hydroxide, such as magnesium oxide, is capable B-staging thermosetting vinyl ester resins at room temperature only if the resins have been chemically modified to contain free carboxylic acid groups, such as described in U.S. Pat. No. 3,548,030, or modified to contain an increased proportion of ester groups, such as described in U.S. Pat. No. 4,197,390. The processes described in these two patents are also costly since they require the preparation of a special vinyl ester resin.

SUMMARY OF THE INVENTION

It is therefore an object of the present invention to overcome the above drawbacks and to provide a curable vinyl ester resin composition wherein the vinyl ester resin is a conventional unmodified resin which can nevertheless undergo B-staging at room temperature.

In accordance with the present invention, there is thus provided a curable vinyl ester resin composition capable of undergoing B-staging at room temperature, comprising:

a) an unmodified vinyl ester resin;
b) a reactive diluent consisting of an ethylenically unsaturated monomer;
c) a free-radical curing agent;
d) a B-staging agent comprising a Group II metal oxide or hydroxide, or a mixture thereof; and
e) a thickening agent comprising an ester, a ketone, an aldehyde or a mixture thereof;

wherein the thickening agent coacts with the B-staging agent to cause B-staging of the vinyl ester resin at room temperature.

Applicant has found quite unexpectedly that organic compounds containing one or two ester or carbonyl groups such as found in most readily available esters, ketones and aldehydes synergistically coact with Group II metal oxides or hydroxides to cause B-staging of a conventional unmodified vinyl ester resin at room temperature. If the ester, ketone or aldehyde is used without the Group II metal oxide or hydroxide, it does not cause B-staging of the resin. On the other hand, if the Group II metal oxide or hydroxide is used alone, it is known that such a metal oxide or hydroxide is not capable of B-staging an unmodified vinyl ester resin at room temperature.

Examples of suitable esters which may be used in accordance with the invention include ethyl acetate, octyl acetate, ethyl butyrate, diisobutyl phthalate and 2,2,4-trimethyl-1,3-pentanediol diisobutyrate. Diisopropyl phthalate is preferred. It is also possible to use, as thickening agent, a ketone such as acetone, 2-butanone and methyl isobutyl ketone, and/or an aldehyde such as acetic aldehyde, propionic aldehyde and 3-methyl butanal. Methyl isobutyl ketone is preferred. A particularly preferred thickening agent comprises a mixture of diisobutyl phthalate and methyl isobutyl ketone, or a mixture of diisobutyl phthalate, methyl isobutyl ketone and 2,2,4-trimethyl pentanediol diisobutyrate. The thickening agent is generally present in the resin composition of the invention in an amount of about 0.5 to about 3 weight %, preferably about 1 weight %, based on the total weight of the composition.

The B-staging agent is advantageously a Group II metal oxide. Magnesium oxide is preferred. The B-staging agent is generally present in the resin composition of the invention in an amount of about 1 to about 5 weight %, preferably about 2 weight %, based on the total weight of the composition.

The vinyl ester resin is generally used in an amount of about 54 to about 58 weight %, preferably about 58 weight %, based on the total weight of the composition. A particularly preferred vinyl ester resin is an epoxy novolac-based vinyl ester resin.

The vinyl ester resin composition according to the invention further includes a reactive diluent consisting of an ethylenically unsaturated monomer which participates to the cross-linking of the vinyl ester resin during subsequent curing thereof. Examples of suitable reactive diluents which may be used include styrene, vinyl toluene, divinylbenzene as well as the methyl, ethyl, isopropyl and octyl esters of acrylic or methacrylic acid. Styrene is preferred. The reactive diluent is generally present in the resin composition of the invention in an amount of about 35 to about 40 weight %, preferably about 38 weight %, based on the total weight of the composition.

Use is preferably made of an epoxy novolac-based vinyl ester resin diluted in styrene, sold by the Dow Chemical Company under the trade-mark DERAKANE 470-300. Such a diluted resin comprises about 50 to about 70 weight % of the vinyl ester resin and about 30 to about 50 weight % of styrene. It has a viscosity ranging from about 250 to about 550 centipoises.

The vinyl ester resin composition of the invention also includes a free-radical curing agent such as an organic peroxide, to initiate cross-linking of the vinyl ester resin with the ethylenically unsaturated monomer during the subsequent curing of the resin composition. Methyl isobutyl ketone peroxide is preferably used as free-radical curing agent. The curing agent is generally present in the resin composition in an amount of about 0.5 to about 3 weight %, preferably about 1 weight %, based on the total weight of the composition.

A particularly preferred curable vinyl ester resin composition capable of undergoing B-staging at room temperature comprises:

about 58 weight % of an unmodified vinyl ester resin such as an epoxy novolac-based vinyl ester resin;
about 38 weight % of a reactive diluent such as styrene;
about 1 weight % of an organic peroxide such as methyl isobutyl ketone peroxide;
about 2 weight % of magnesium oxide;

about 0.7 weight % of diisobutyl phthalate;

about 0.25 weight % of methyl isobutyl ketone; and about 0.05 weight % of 2,2,4-trimethyl-1,3-pentanediol diisobutyrate.

The vinyl ester resin composition according to the invention is particularly useful for impregnating a fibrous material such as a woven fabric material. The fibrous material impregnated with the vinyl ester resin composition of the invention has a shelf life of up to 12 months. B-staging is generally reached in about two weeks following mixture of the various components and impregnation of the fibrous material.

The present invention therefore provides, in another aspect thereof, a fibrous material impregnated with a curable vinyl ester resin composition capable of undergoing B-staging at room temperature, wherein the vinyl ester resin composition comprises:

a) an unmodified vinyl ester resin;

b) a reactive diluent consisting of an ethylenically unsaturated monomer;

c) a free-radical curing agent;

d) a B-staging agent comprising a Group II metal oxide or hydroxide, or a mixture thereof; and e) a thickening agent comprising an ester, a ketone, an aldehyde or a mixture thereof;

the thickening agent coacting with the B-staging agent to cause B-staging of the vinyl ester resin at room temperature.

DESCRIPTION OF PREFERRED EMBODIMENTS

The following non-limiting examples further illustrate the invention.

EXAMPLE 1

A vinyl ester resin composition was prepared by blending 96.6 weight % of an epoxy novolac-based vinyl ester resin diluted in styrene, sold under the trade-mark DERAKANE 470-300, 1.7 weight % of a mixture of organic compounds sold by the Norac Company, Inc. under the trade-mark NOROX PULCAT A (containing 45 weight % of methyl isobutyl ketone peroxide, 36 weight % of diisobutyl phthalate, 14 weight % of methyl isobutyl ketone and 5 weight % of 2,2,4-trimethyl-1,3-pentanediol diisobutyrate), and 1.7 weight % of magnesium oxide. NOROX PULCAT A is conventionally used in pultrusion processes.

The above vinyl ester resin composition was then used to impregnate a woven E-glass fabric, using a four roll impregnator. A release separator film was used and wound with the impregnated fabric. Packed in a gas barrier film and stored at room temperature, the resin composition gradually thickened and reached a stable B-stage within two weeks. The resin impregnated fabric remained stable at room temperature for one year. When desired, it can be molded at about 125° C. during about 15 minutes, for a complete cure.

EXAMPLE 2

Example 1 was repeated, with the exception that 94.6 weight % of DERAKANE 470-300, 1.6 weight % of NOROX PULCAT A, 1.9 weight % of magnesium dioxide and 1.9 weight % of a thixotropic filler sold under the trade-mark AEROSIL R 202. B-staging was reached within two weeks. The resin impregnated fabric also remained stable at room temperature for one year.

I claim:

1. A curable vinyl ester resin composition capable of undergoing B-staging at room temperature, comprising:

a) an unmodified vinyl ester resin;

b) a reactive diluent consisting of an ethylenically unsaturated monomer;

c) a free-radical curing agent;

d) a B-staging agent comprising a Group II metal oxide or hydroxide, or a mixture thereof; and e) a thickening agent having no free carboxyl groups and comprising an ester, a ketone, an aldehyde or a mixture thereof;

wherein said thickening agent coacts with said B-staging agent to cause B-staging staging of said vinyl ester resin at room temperature.

2. A vinyl ester resin composition as claimed in claim 1, wherein said vinyl ester resin is an epoxy novolac-based vinyl ester resin.

3. A vinyl ester resin composition as claimed in claim 1, wherein said vinyl ester resin is present in an amount of about 54 to about 58 weight %, based on the total weight of the composition.

4. A vinyl ester resin composition as claimed in claim 3, wherein the amount of said vinyl ester resin is about 58 weight %.

5. A vinyl ester resin composition as claimed in claim 1, wherein said reactive diluent is styrene.

6. A vinyl ester resin composition as claimed in claim 1, wherein said reactive diluent is present in an amount of about 35 to about 40 weight %, based on the total weight of the composition.

7. A vinyl ester resin composition as claimed in claim 6, wherein the amount of said reactive diluent is about 38 weight %.

8. A vinyl ester resin composition as claimed in claim 1, wherein said free-radical curing agent is an organic peroxide.

9. A vinyl ester resin composition as claimed in claim 8, wherein said organic peroxide is methyl isobutyl ketone peroxide.

10. A vinyl ester resin composition as claimed in claim 1, wherein said free-radical curing agent is present in an amount of about 0.5 to about 3 weight %, based on the total weight of the composition.

11. A vinyl ester resin composition as claimed in claim 10, wherein the amount of said free-radical curing agent is about 1 weight %, based on the total weight of the composition.

12. A vinyl ester resin composition as claimed in claim 1, wherein said B-staging agent is a Group II metal oxide.

13. A vinyl ester resin composition as claimed in claim 12, wherein said Group II metal oxide is magnesium oxide.

14. A vinyl ester resin composition as claimed in claim 1, wherein said B-staging agent is present in an amount of about 1 to about 5 weight %, based on the total weight of the composition.

15. A vinyl ester resin composition as claimed in claim 14, wherein the amount of said B-staging agent is about 2 weight %.

16. A vinyl ester resin composition as claimed in claim 1, wherein said ester is selected from the group consisting of ethyl acetate, octyl acetate, ethyl butyrate, diisobutyl phthalate and 2,2,4-trimethyl-1,3-pentanediol diisobutyrate.

17. A vinyl ester resin composition as claimed in claim 16, wherein said ester is diisobutyl phthalate.

18. A vinyl ester resin composition as claimed in claim 1, wherein said ketone is selected from the group consisting of acetone, 2-butanone and methyl isobutyl ketone.

19. A vinyl ester resin composition as claimed in claim 18, wherein said ketone is methyl isobutyl ketone.

20. A vinyl ester resin composition as claimed in claim 1, wherein said aldehyde is selected from the group consisting of acetic aldehyde, propionic aldehyde and 3-methyl butanal.

21. A vinyl ester resin composition as claimed in claim 1, wherein said thickening agent comprises a mixture of diisobutyl phthalate and methyl isobutyl ketone.

22. A vinyl ester resin composition as claimed in claim 1, wherein said thickening agent comprises a mixture of diisobutyl phthalate, methyl isobutyl ketone and 2,2,4-trimethyl pentanediol diisobutyrate.

23. A vinyl ester resin composition as claimed in claim 1, wherein said thickening agent is present in an amount of about 0.5 to about 3 weight %, based on the total weight of the composition.

24. A vinyl ester resin composition as claimed in claim 23, wherein the amount of said thickening agent is about 1 weight %.

25. A curable vinyl ester resin composition capable of undergoing B-staging at room temperature, comprising:
  about 58 weight % of an unmodified vinyl ester resin;
  about 38 weight % of a reactive diluent consisting of an ethylenically unsaturated monomer;
  about 1 weight % of an organic peroxide;
  about 2 weight % of magnesium oxide;
  about 0.7 weight % of diisobutyl phthalate;
  about 0.25 weight % of methyl isobutyl ketone; and
  about 0.05 weight % of 2,2,4-trimethyl-1,3-pentanediol diisobutyrate.

26. A vinyl ester resin composition as claimed in claim 25, wherein said vinyl ester resin is an epoxy novolac-based vinyl ester resin.

27. A vinyl ester resin composition as claimed in claim 26, wherein said reactive diluent is styrene.

28. A fibrous material impregnated with a curable vinyl ester resin composition capable of undergoing B-staging at room temperature, wherein said vinyl ester resin composition comprises:
  a) an unmodified vinyl ester resin;
  b) a reactive diluent consisting of an ethylenically unsaturated monomer;
  c) a free-radical curing agent;
  d) a B-staging agent comprising a Group II metal oxide or hydroxide, or a mixture thereof; and
  e) a thickening agent having no free carboxyl groups and comprising an ester, a ketone, an aldehyde or a mixture thereof;
wherein said thickening agent coacts with said B-staging agent to cause B-staging of said vinyl ester resin at room temperature.

29. A resin impregnated fibrous material as claimed in claim 28, wherein said vinyl ester resin is an epoxy novolac-based vinyl ester resin.

30. A resin impregnated fibrous material as claimed in claim 28, wherein said vinyl ester resin is present in said vinyl ester resin composition in an amount of about 54 to about 58 weight %, based on the total weight of the composition.

31. A resin impregnated fibrous material as claimed in claim 30, wherein the amount of said vinyl ester resin is about 58 weight %.

32. A resin impregnated fibrous material as claimed in claim 28, wherein said reactive diluent is styrene.

33. A resin impregnated fibrous material as claimed in claim 28, wherein said reactive diluent is present in said vinyl ester resin composition in an amount of about 35 to about 40 weight %, based on the total weight of the composition.

34. A resin impregnated fibrous material as claimed in claim 33, wherein the amount of said reactive diluent is about 38 weight %.

35. A resin impregnated fibrous material as claimed in claim 28, wherein said free-radical curing agent is an organic peroxide.

36. A resin impregnated fibrous material as claimed in claim 35, wherein said organic peroxide is methyl isobutyl ketone peroxide.

37. A resin impregnated fibrous material as claimed in claim 28, wherein said free-radical curing agent is present in said vinyl ester resin composition in an amount of about 0.5 to about 3 weight %, based on the total weight of the composition.

38. A resin impregnated fibrous material as claimed in claim 37, wherein the amount of said free-radical curing agent is about 1 weight %, based on the total weight of the composition.

39. A resin impregnated fibrous material as claimed in claim 28, wherein said B-staging agent is a Group II metal oxide.

40. A resin impregnated fibrous material as claimed in claim 39, wherein said Group II metal oxide is magnesium oxide.

41. A resin impregnated fibrous material as claimed in claim 28, wherein said B-staging agent is present in said vinyl ester resin composition in an amount of about 1 to about 5 weight %, based on the total weight of the composition.

42. A resin impregnated fibrous material as claimed in claim 41, wherein the amount of said B-staging agent is about 2 weight %.

43. A resin impregnated fibrous material as claimed in claim 28, wherein said ester is selected from the group consisting of ethyl acetate, octyl acetate, ethyl butyrate, diisobutyl phthalate and 2,2,4-trimethyl-1,3-pentanediol diisobutyrate.

44. A resin impregnated fibrous material as claimed in claim 43, wherein said ester is diisobutyl phthalate.

45. A resin impregnated fibrous material as claimed in claim 28, wherein said ketone is selected from the group consisting of acetone, 2-butanone and methyl isobutyl ketone.

46. A vinyl ester resin composition as claimed in claim 45, wherein said ketone is methyl isobutyl ketone.

47. A resin impregnated fibrous material as claimed in claim 28, wherein said aldehyde is selected from the group consisting of acetic aldehyde, propionic aldehyde and 3-methyl butanal.

48. A resin impregnated fibrous material as claimed in claim 28, wherein said thickening agent comprises a mixture of diisobutyl phthalate and methyl isobutyl ketone.

49. A resin impregnated fibrous material as claimed in claim 28, wherein said thickening agent comprises a mixture of diisobutyl phthalate, methyl isobutyl ketone and 2,2,4-trimethyl pentanediol diisobutyrate.

50. A resin impregnated fibrous material as claimed in claim 28, wherein said thickening agent is present in said vinyl ester resin composition in an amount of about 0.5 to about 3 weight %, based on the total weight of the composition.

51. A resin impregnated fibrous material as claimed in claim 50, wherein the amount of said thickening agent is about 1 weight %.

52. A resin impregnated fibrous material as claimed in claim 28, wherein the fibrous material is a woven fabric material.

53. A fibrous material resin impregnated with a curable vinyl ester resin composition capable of undergoing B-staging at room temperature, wherein said vinyl ester composition comprises:

about 58 weight % of an unmodified vinyl ester resin;

about 38 weight % of a reactive diluent consisting of an ethylenically unsaturated monomer;

about 1 weight % of an organic peroxide;

about 2 weight % of magnesium oxide;

about 0.7 weight % of diisobutyl phthalate;

about 0.25 weight % of methyl isobutyl ketone; and about 0.05 weight % of 2,2,4-trimethyl-1,3-pentanediol diisobutyrate.

54. A resin impregnated fibrous material as claimed in claim 53, wherein said vinyl ester resin is an epoxy novolac-based vinyl ester resin.

55. A resin impregnated fibrous material as claimed in claim 54, wherein said reactive diluent is styrene.

56. A resin impregnated fibrous material as claimed in claim 55, wherein the fibrous material is a woven fabric material.

\* \* \* \* \*